US009135356B2

(12) United States Patent
Schleifer

(10) Patent No.: US 9,135,356 B2
(45) Date of Patent: Sep. 15, 2015

(54) PSEUDONAMING ANONYMOUS PARTICIPANTS

(75) Inventor: Jason E. Schleifer, Cambridge, MA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 813 days.

(21) Appl. No.: 12/630,359

(22) Filed: Dec. 3, 2009

(65) Prior Publication Data

US 2011/0138302 A1 Jun. 9, 2011

(51) Int. Cl.
 G06F 3/00 (2006.01)
 G06F 17/30 (2006.01)
 G06Q 10/10 (2012.01)

(52) U.S. Cl.
 CPC ...... *G06F 17/3089* (2013.01); *G06F 17/30867* (2013.01); *G06Q 10/10* (2013.01)

(58) Field of Classification Search
 CPC . G06F 3/0481; H04L 12/581; H04L 12/1813; H04L 12/1822; H04L 41/22; G06Q 10/101
 USPC .................................. 715/758, 753, 733, 751
 See application file for complete search history.

(56) References Cited

U.S. PATENT DOCUMENTS

| 5,923,842 | A  | * | 7/1999  | Pedersen et al. ................. 726/8 |
| 5,987,376 | A  |   | 11/1999 | Olson |
| 6,697,840 | B1 |   | 2/2004  | Godefroid |
| 7,234,059 | B1 | * | 6/2007  | Beaver et al. ................. 713/170 |
| 7,277,888 | B2 |   | 10/2007 | Gelormine |
| 7,468,729 | B1 | * | 12/2008 | Levinson ...................... 345/473 |
| 7,555,525 | B2 | * | 6/2009  | Malik ............................ 709/206 |
| 7,738,897 | B2 | * | 6/2010  | Tillet et al. ................... 455/519 |
| 7,917,447 | B1 | * | 3/2011  | Smith .......................... 705/319 |
| 8,224,916 | B2 | * | 7/2012  | Kucharewski et al. ....... 709/206 |
| 2002/0004900 | A1 | * | 1/2002 | Patel ............................ 713/155 |
| 2004/0047461 | A1 | * | 3/2004 | Weisman et al. ........ 379/202.01 |
| 2005/0068983 | A1 | * | 3/2005 | Carter et al. .................. 370/480 |
| 2005/0114453 | A1 | * | 5/2005 | Hardt ........................... 709/206 |
| 2005/0181878 | A1 | * | 8/2005 | Danieli et al. .................. 463/42 |
| 2005/0204011 | A1 | * | 9/2005 | Velayudham ................ 709/206 |

(Continued)

FOREIGN PATENT DOCUMENTS

WO 2009023983 A1 2/2009

OTHER PUBLICATIONS

"Metadata Elements for Session Descriptions"—Published Date: Jun. 2001 http://www.mpi.nl/IMDI/documents/Proposals/ISLE_MetaData_2.5.pdf.
Schend,Steven Edward, "Character Name Generator"—Published Date: Feb. 8, 2001 http://www.wizards.com/default.asp?x=dnd/dnd/20010208b.

(Continued)

*Primary Examiner* — Rashawn Tillery
(74) *Attorney, Agent, or Firm* — Dan Choi; Judy Yee; Micky Minhas

(57) ABSTRACT

One or more techniques and/or systems are disclosed herein for assigning familiar pseudonames to anonymous user members in a shared online environment. Creation of a name pool is provided for using a programmed processor disposed in a computing device. The name pool includes familiar names that may be contextually relevant to a group of user members in the shared online environment. A name from the name pool is provided for assignment to an anonymous user member in the shared online environment, where assignment of the name is, at least in part, based on characteristics of the anonymous user member relative to the shared online environment.

20 Claims, 7 Drawing Sheets

(56) References Cited

U.S. PATENT DOCUMENTS

| | | | |
|---|---|---|---|
| 2005/0261043 A1* | 11/2005 | Slade | 463/1 |
| 2005/0262542 A1* | 11/2005 | DeWeese et al. | 725/106 |
| 2007/0100868 A1* | 5/2007 | Hackmann | 707/102 |
| 2008/0221998 A1 | 9/2008 | Mendelsohn | |
| 2009/0259485 A1 | 10/2009 | Perlman | |
| 2010/0050093 A1* | 2/2010 | Behrens et al. | 715/753 |
| 2010/0113162 A1* | 5/2010 | Vemuri et al. | 463/42 |

OTHER PUBLICATIONS

"Can Participants Be Anonymous? (Not Have to Put In an Email or Any Other Identifier)"—Published Date: 2009 http://getsatisfaction.com/websort/topics/can_participants_be_anonymous_not_have_to_put_in_an_email_or_any_other_identifier.

Godefroid; Patrice, "Ensuring Privacy in Presence Awareness Systems: An Automated Verification Approach"—Retrieved Date: Nov. 10, 2009 http://citeseerx.ist.psu.edu/viewdoc/download?doi=10.1.1.32.9498&rep=rep1&type=pdf.

* cited by examiner

PSEUDONAMING ANONYMOUS PARTICIPANTS

BACKGROUND

In a computing environment, an online community or virtual community is made up of a group of people that primarily interact using online communication media such as Internet-based news, email, Internet-based social networking sites, chat rooms, forum discussions and instant messaging, for example, rather than in person. Often, the online community is used for entertainment, social, professional, educational and/or other purposes. Online communities can supplement relational communication between people who know each other in real life, and are also often a primary form of communication between those who have never met in person, and may prefer to remain anonymous.

Many type of programs, services and software, separately or in combination, are used for online communications, including games, text-based chat rooms and forums that use voice, video text and/or avatars. Recently, online communities utilize a shared online environment that provides for users to interact with each other, such as a virtual world or online game, and/or collaborate with each other, such as online meetings, presentations, and live forum discussions.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Presently, online collaboration and interaction environments and tools do not have a socially friendly means to identify different anonymous users in a shared online environment, such as an online meeting or forum. Commonly, when an anonymous user enters a shared online environment a next sequential number is added as a suffix to a neutral "user," or "anonymous," as in user1, user 2, or anonymous 1, anonymous2. The anonymity of the user, along with the neutral handle associated the user's interaction does not typically engender a social relevance or feeling of some sort of human interaction with others in the shared environment.

One or more techniques and/or systems are disclosed that provide for anonymous members of a shared online environment, where people interact and/or collaborate as users, with a given (non-neutral) name. As an example, the given name can provide contextual relevance to the shared environment by being associated with particular characteristics of the environment. Further, the given name can be socially relevant to the others in the group, and/or familiar as a reference from popular culture. As another example, common characters from popular media can be utilized that are relevant to the shared online environment, such as movies that have a similar theme to the topics discussed in an online forum.

In one embodiment, where familiar pseudonames are assigned to anonymous user members in a shared online environment, creation of a name pool is provided for, where the name pool includes familiar names that can be contextually relevant to a group of user members in the shared online environment. Further, a name from the name pool is provided for assignment to an anonymous user member in the shared online environment. Here, the assignment of the name can be, at least in part, based on characteristics of the anonymous user member relative to the shared online environment. In another example, the name pool may comprise names that are not necessarily contextually relevant, but that comprise names that are at least familiar and/or otherwise recognizable to user members.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
FIG. 1 is an illustration of an exemplary environment where one or more techniques and/or systems described herein may be implemented.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

FIG. 1 is an illustration of an exemplary environment 100 where one or more techniques and/or systems described herein may be implemented. Remote users of online services can interact with each other using a variety of services, such as an online chat environment 102. The online chat environment 102, for example, can be hosted on a remote server (not shown) running an online chat service, such as an Internet-based social networking site. Users 106 can connect with the online chat environment 102 by connecting to the chat service over the Internet, for example.

In this example 100, a user member of the service 102 (jeremy25) may have a buddy list 108 of other users that frequently interact with the user member. The buddy list often comprises user known the user member. However, it is common for anonymous users 106 (e.g., user1, user2, user3) to join a chat environment 102, and add to the ongoing conversation 104. In the online chat environment, the users can type messages 110 and send them to the conversation, even adding additional expressions 112, such as emoticons.

While anonymous users may often join a conversation, or some other online collaboration/interaction, as an anonymous user they typically don't engender a sense of close interaction or collaboration with the other users in the environment. A simple "user1" often denotes a cold, neutral feeling when interacting. However, when a user has a known name, or at least one that is recognizable and related to a collaboration topic, it may enable a more enjoyable experience for the online shared environment.

As provided herein, method may be devised that provides for assigning pseudo-usernames (pseudonames), whereby the pseudonames can be recognizable to other users in the online shared environment (e.g., a chat room). Further, the pseudonames can provide context, for example, where the pseudoname can relate to a shared experience for the users in the shared online environment, and/or relate to a characteristic of the shared online environment (e.g., topic, type of environment, etc.). In this way, for example, anonymous user members in the online shared environment may relate and interact in a way that enhances the experience.

Figure 2:
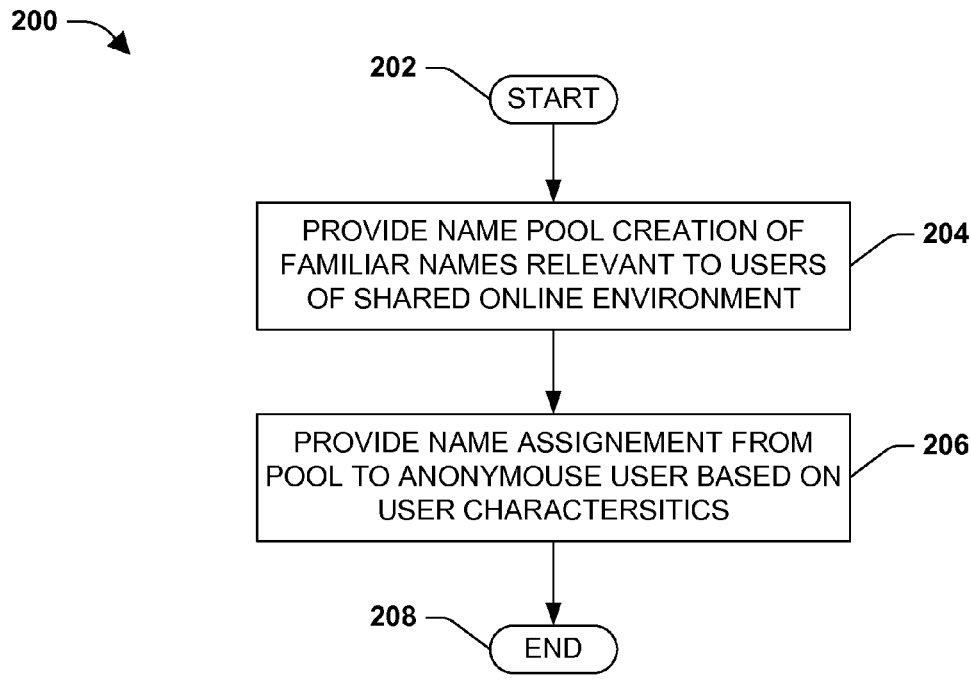
FIG. 2 is a flow diagram illustrating an exemplary method for assigning familiar pseudonames to anonymous user members in a shared online environment.

FIG. 2 is a flow diagram illustrating an exemplary method 200 for assigning familiar pseudonames to anonymous user members in a shared online environment. The exemplary method 200 begins at 202 and involves providing for creation of a name pool, such as using a programmed processor in a computer (e.g., the user's computer that initiates the online shared environment), at 204. The name pool is created to contain familiar names that can be contextually relevant to a group of user members in the shared online environment.

For example, a shared online environment may be a scientific presentation related to physics, where users may have an ongoing collaboration on a theory presented in the presentation. In this example, the user that initiated the presentation can create a name pool that includes various famous scientists from the field of physics, such as Einstein, Fermi, Hawking, etc. In this way, the names in the name pool are familiar to the users as famous scientists, and can be contextually relevant to the topic of physics.

At 206, in the exemplary method 200, a name from the name pool is provided for assignment to an anonymous user member in the shared online environment. The name is assigned to the anonymous user member, at least in part, based on characteristics of the anonymous user member relative to the shared online environment. For example, the leader of the physics collaboration may be assigned the pseudoname "Einstein," as Einstein is commonly known as the leading name in physics. Further, the leader of the collaboration may be assigned "Einstein" based on some characteristics developed during discussions that relate to particular characteristics of Einstein, such as commonly used words, reactions, or discussion topics brought up by the leader in previous discussions.

Having assigned a name to an anonymous user member, the exemplary method 200 ends at 208.

Figure 3:
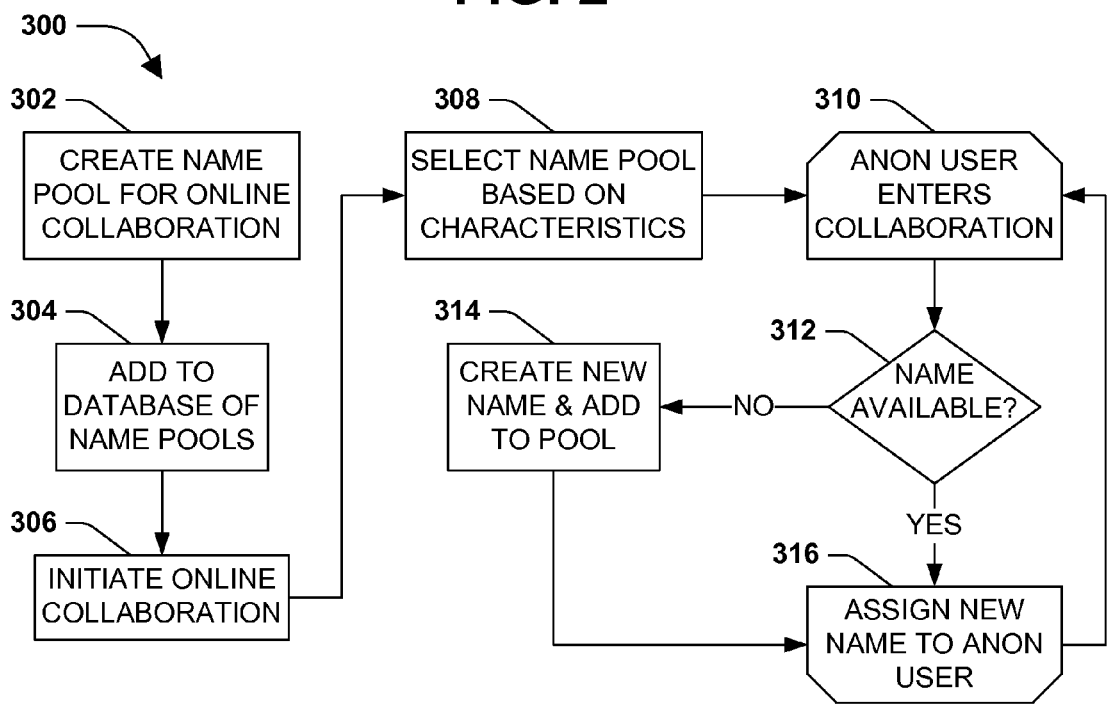
FIG. 3 is a flow diagram illustrating an exemplary embodiment of one or more of the methods described herein.

FIG. 3 is a flow diagram illustrating an exemplary embodiment 300 of one or more of the methods described herein. At 302, a name pool is created for an online collaboration, such as a multiuser game (e.g., card games, role-playing games, murder mystery, etc.). For example, the online game may involve a number of players interacting in a fantasy-based world. In this example, appropriate names for the name pool may comprise characters from a fantasy-based novel or movie (e.g., Lord of the Rings).

In one embodiment, the name pool can comprise a number of names sufficient to assign a given name to respective anonymous members in the shared online environment. That is, the name pool will have at least a same number (or more) of names as a number of user members in the online shared environment. For example, if twelve user member spaces are assigned to a game at one time, the name pool can contain at least twelve names for assignment. In another embodiment, the name pool can be created with particular characteristics. For example, the name pool comprising characters from a fantasy novel or movie can have the characteristic "fantasy" assigned to it, as well as any others that are deemed appropriate (e.g., related to a specific group of users and/or situations, such as gaming).

At 304, in the exemplary embodiment 300, the name pool is added to a database of name pools. In one embodiment a plurality of name pools can be created, where a name pool in the plurality has one or more characteristics that are related to the names in the name pool. For example, as described above, a name pool that comprises names from the US Supreme Court may have a characteristic of "law," and "Supreme Court." Other examples of name pools may include characters from a television sit-com, and have a characteristic of "comedy," of something else that relates the characters to the name pool. In one embodiment, the characteristics can be selected by a user, such as the user that created the name pool. In another embodiment, the name pool's characteristics may be selected automatically based on the type of characters and/or a context for the characters (e.g., movie, TV show, novel, etc.).

In one embodiment, the name pool can be stored in a local database on a local machine connected to the shared online environment. For example, where a user creates the name pool, the name pool can be stored on the user's local machine. In this example, then the user connects to the shared online environment the name pool can be accessed from the local machine. In another embodiment, the name pool can be stored in a remote database on a remote machine connected to the shared online environment. For example, the shared online environment may be resident on a remote server to which respective users connect to collaborate. In this example, the name pool can be stored on the remote server and accessed by the shared online environment from that location.

At 306, an online collaboration is initiated in the shared online environment. An online shared environment may comprise a user interaction environment, in one embodiment, such as an online world where users interact with each other. In another embodiment, the online shared environment may comprise a collaboration environment, for example, where users collaborate on ideas, presentations, topics and discussions, such as a scientific chat or presentation.

Figure 4:
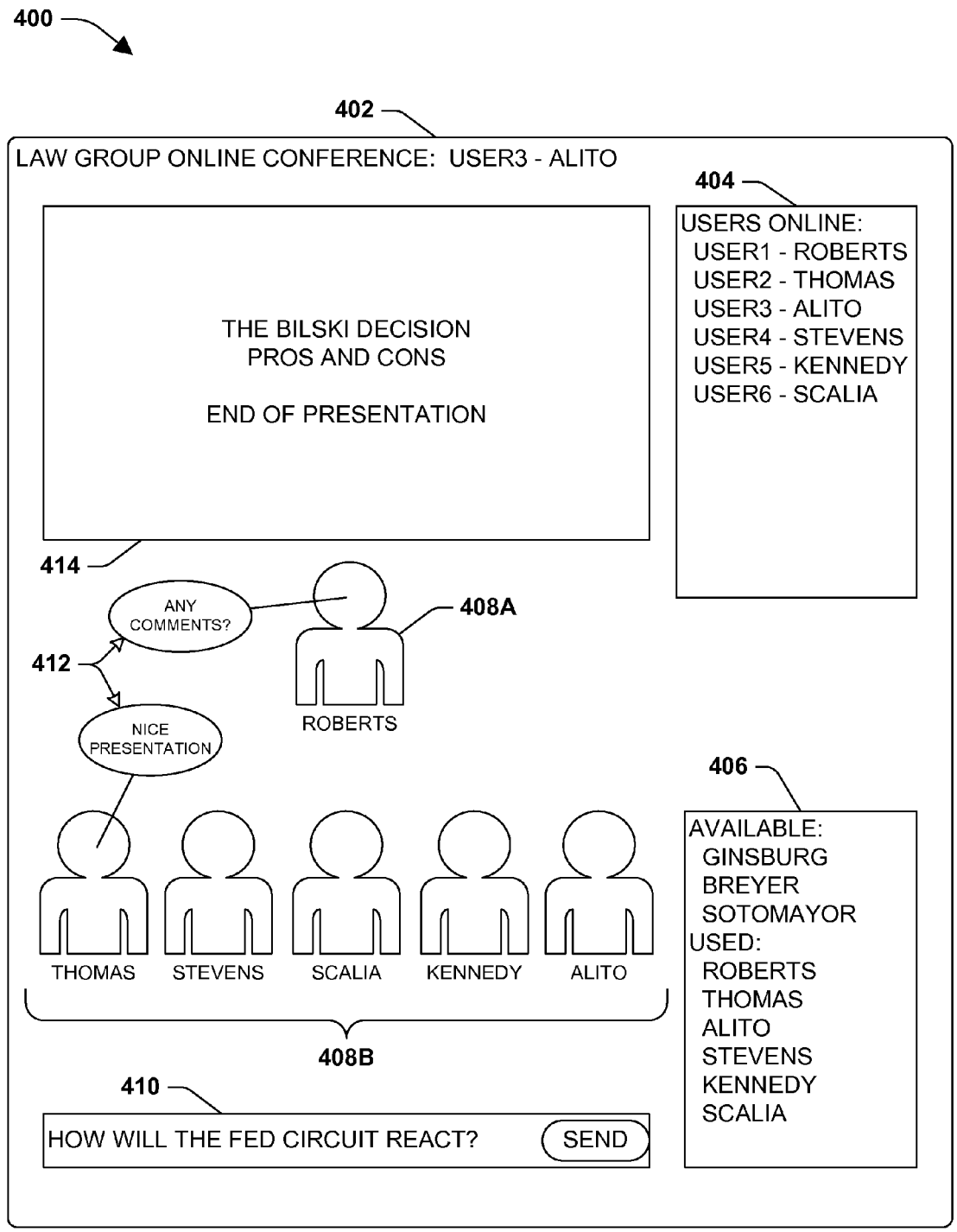
FIG. 4 is an illustration of an exemplary online shared environment that can implement one or more of the methods and/or systems described herein.

FIG. 4 is an illustration of an exemplary embodiment 400 of an online shared environment that can implement one or more of the methods and/or systems described herein. The online share environment comprises a law group conference 402 (logged in as user3), for example, where user members 404 can collaborate on particular law-related topics. In this exemplary embodiment 400, the law conference 402 may have been initiated by user1 as the presenter of the topic for discussion 414.

At 306, in the exemplary embodiment 300 of FIG. 3, a name pool is selected for the online shared environment based, at least in part, on characteristics of the name pool relative to characteristics of the online shared environment. In one embodiment, a name pool can be selected by a user, such as the user that initiates or creates the online shared environment. For example, as illustrated in FIG. 4, because the collaboration involves law topics 402, and the presentation topic relates to a US Supreme Court decision 414, user1 may select a name pool 406 that comprises US Supreme Court justice names.

In another embodiment, the name pool may be selected automatically, based on the characteristics of the name pool and the online shared environment. For example, as shown in FIG. 4, then the law conference 402 is initiated, characteristics for the conference can be included. In this example, the service that hosts the online shared environment can automatically (e.g., programmatically) search the database for a name pool that comprises the characteristics included with the initiated conference (e.g., law and Supreme Court decision). In this way, as shown in the exemplary embodiment 400, the name pool 406 that comprises the US Supreme Court justices can be selected for the law conference 402.

In the exemplary embodiment 300 of FIG. 3, a loop begins at 310. At 310, an anonymous user enters the online shared collaboration. For example, a user may log into the law conference collaboration 402, of FIG. 4, as directed by an invitation sent out to interested parties. As another example, users may log into or browse to online shared environments regularly as anonymous users, or periodically, such as a gaming or virtual world environment. Some examples may include online meeting websites, Intranet conference sites, online gaming and virtual worlds, chat rooms, live (or otherwise) forums and discussion sites, and more.

At 312, a determination is made as to whether a name is available for the anonymous user in the name pool. For example, a name can be available for assignment to the anonymous user if all of the names in the name pool have not been assigned already. That is, there are more names in the name pool that anonymous users in the online shared environment. A name may not be available for the anonymous user if the names are already fully assigned to existing anonymous users in the online shared environment, and/or names have been reserved for users (e.g., where a leader of the discussion in FIG. 4 reserves "Roberts" 408A as the Chief Justice of the US Supreme Court).

At 316, if a name is available for the anonymous user ("YES" from 312), a new name from the name pool is assigned to the anonymous user. In one embodiment, a user can assign the name from the name pool to the anonymous user member when the user member enters the shared online environment. For example, as illustrated in the exemplary embodiment 400 of FIG. 4, the leader or initiator of the law group collaboration/discussion 402 can assign the name "Roberts" 408A to themselves from the name pool 406. Further, the leader/initiator may wish to assign names 404 from the name pool 406 to respective anonymous user members that enter the law group conference 402. As another example, a user that enters anonymously may assign a name from the name pool 406 (e.g., from the available names, Ginsburg, Breyer, Sotomayor) to themselves when they enter the online shared environment. As shown in FIG. 4, user3 may have a particular affinity to Justice Alito and can assign the pseudoname "Alito" 404 to their username in the conference.

In another embodiment, a name may be assigned from the name pool to an anonymous user member automatically, when the user member enters the shared online environment anonymously. For example, when an anonymous user enters the online shared environment a next name from the name pool can be assigned. In other embodiments, the names may be ranked in the name pool in a preference, such as based on importance in the affiliated reference (e.g., novel, movie, etc.) or some other characteristic, and are assigned to anonymous users in order of entrance to the online environment.

In one embodiment, the names can be assigned from the name pool based on characteristics of the anonymous users in relative context with the names from the pool. For example, if a group of anonymous users regularly meet online, such as for weekly law group conferences as in FIG. 4, they may display particular characteristics based on discussion and/or actions (e.g., chattiness, shyness, aggression, kindness, or particular topics of conversation, etc.). In this example, the name assignment can be based on the user member's developed characteristics, where the name may have similar characteristics associated with it. For example, where a user acts like a particular movie character (e.g., a sidekick), the name of the associated (sidekick) movie character can be automatically (or chosen by a user) selected for that particular user member.

At 314, in the exemplary embodiment 300 of FIG. 3, if a name is not available for the anonymous user ("NO" from 312), a new name can be created and added to the name pool for the online shared environment. For example, as shown in FIG. 4, if all of the names are assigned to users 404 from the name pool 406 a name can be created and added to the name pool. In one embodiment, a random name tag can be created and added to the pool. In another embodiment, a contextually relevant name can be created, for example, a name of a previous Supreme Court justice or some other judge or law related name. At 316, the newly created and added name can be assigned to the anonymous user. If another anonymous user enters the online collaboration, the loop can return to 310.

As described above, FIG. 4 illustrates an example of implementing one or more of the techniques and/or systems for assigning familiar names to anonymous users of a shared online environment, for example. In this example, users 404 can be assigned names from the name pool 406, and collaborate as avatars 408A and 408B in the exemplary conference 402. Often, a leader 408A may present a discussion topic 414, and other user members 408B can discuss 412 by sending written comments 410. In this exemplary embodiment 400, the users are using names from a socially identifiable pool of names, such as US Supreme Court Justices, in a shared space for collaboration on legal issues. In this way, in this example, the users may be more recognizable and, as such, may enable an enhanced experienced during the conference, when compared with the anonymous discussion illustrated in FIG. 1.

Figure 5:
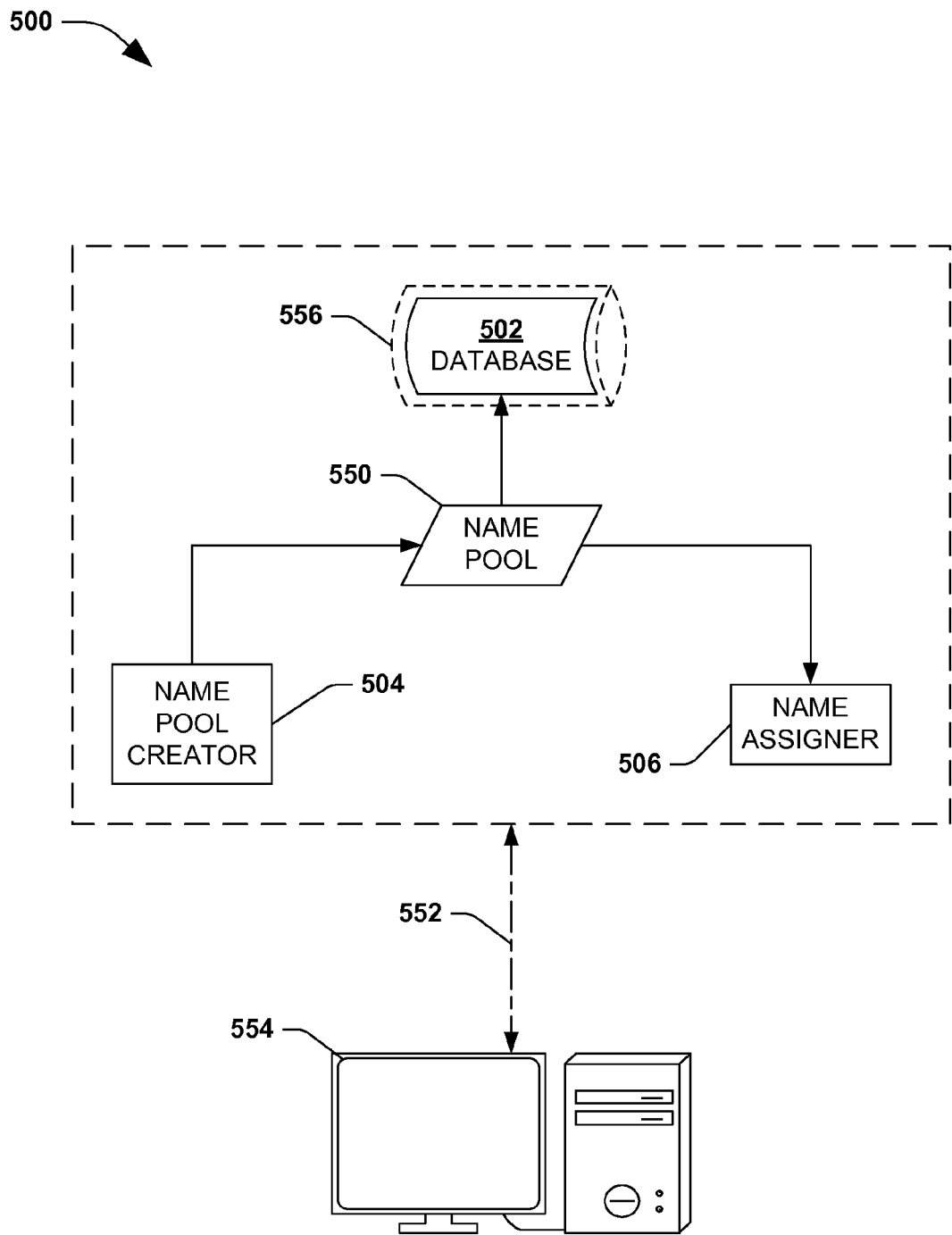
FIG. 5 is a component block diagram of an exemplary system configured to assign familiar pseudonames to anonymous user members in a shared online environment.

A system may be devised that can facilitate assigning of pseudonames that are socially recognizable to other users in the online shared environment (e.g., online conference). In this way, for example, anonymous user members in the online shared environment may relate and interact in a way that enhances the experience. FIG. 5 is a component block diagram of an exemplary system 500 system for assigning familiar pseudonames to anonymous user members in a shared online environment.

A database 502, which can be resident in storage 556 (e.g., memory) on a computing device 554, provides for storage of a name pool 550. A name pool creation component 504 provides for creation of the name pool 550, where the name pool can be stored in the database 502. The name pool 550 comprises familiar names that can be contextually relevant to a group of user members in a shared online environment, such as instantiated on the computing device 554. A name assignment component 506 assigns a name from the name pool 550 to an anonymous user member in the shared online environment. The assignment of the name from the name pool 550 is, at least in part, based on characteristics of the user member relative to the shared online environment. It will be appreciated, that while it may be more common to provide contextually relevant names, this may be difficult if not impossible in some instances. Accordingly, in one example the name pool 550 may merely comprise names that are familiar to the users so that the users would recognize the fundamental make up of the pool (e.g., the names of castaways/characters on a television show). The character names may or may not be assigned to respective users based upon the relationships between the characters and/or the relationships between the users and/or any correlation therebetween. Similarly, the name pool 550 may merely comprise (common) first names with little to no context to at least give different users an identity and not just the name "Anonymous" or "User".

In one embodiment, the database 502 may reside in remote data storage, for example, on a remote server that comprises an instantiation of the shared online environment. In this embodiment, a remote connection 552 can be made between the local user's computing device 554 and the database 502, when creating and/or using the name pool 550. In another embodiment, the database 502 may reside on a user's local machine, such as 554, in local data storage, such as 556. In this embodiment, the local computing device may have a connection 552 to the shared online environment when using the name pool.

It will be appreciated that respective components in the exemplary system 500 are not limited to a particular location. It is anticipated that those skilled in the art may devise alternate embodiments for locations and interconnections for the respective components. For example, while the database 502 may reside on a local computer (e.g., 554), the name pool creation component 504 and name assignment component 506 may reside on a remote server, having a connection 552 to the local machine. Further, other configurations between a remote and local computing device are anticipated.

In one embodiment, the database can comprise one or more name pools, respectively having a plurality of names. In this embodiment, the respective one or more name pools can have one or more characteristics that relate to the plurality of names in the name pool. For example, several name pools may be created that can be used in different shared online environments. Where users interact in a virtual world that takes place on a remote island, the characters from a famous television show about castaways on an island can be used to populate the name pool, for example. Further, where users are involved in a murder mystery game, characters from a popular detective murder game can be used to populate another name pool. In this example, respective name pools can have corresponding characteristics assigned to them, so that when an appropriate shared online environment is initiated, the name pool having matching characteristics can be selected.

In one embodiment, the familiar names for the name pool can comprise names from one or more media elements from popular culture. Several example of media elements from popular culture may include: movies, books, televisions shows, stories (e.g., oral tradition stories), games (e.g., board games, video games, etc.), historical events (e.g., World War II), and songs. As an example, a popular old English epic poem is that of Beowulf, describing heroic acts of Beowulf in old Denmark. This tale includes characters such as Beowulf, Grendel, Grendel's mother, Hroogar the king, Wiglaf and others. In this example, these names comprise in the name pool may have particular characteristics that can be assigned to the pool, such as epic poem, fantasy, old English, and others.

In one embodiment, the name pool creation component 504 can to allow one or more users to select one or more names in the name pool. For example, where a leader or initiator of the shared online experience creates respective names for the pool. Further, other users may be allowed to contribute to the name pool, for example, by selecting contextually relevant names for themselves, to be added to the pool. Additionally, the name pool creation component may allow one or more of the users to select one or more characteristics for the name pool, such as "fantasy," "law," or "sports."

In another embodiment, a user may merely select a media element (as described above) and a particular characteristic, such as "novel" and "murder," and the name pool creation component 504 may automatically (e.g., computationally) select names for the name pool, such as characters from a murder mystery novel. In this way, for example, a plurality of name pools can be created by selecting themes and particular media elements from which to draw names from.

In another embodiment, the name assignment component 506 may automatically (e.g., computationally) assign a name from the name pool 550 when a user member enters the shared online environment anonymously. As an example, the anonymous user may merely be automatically assigned a next available name from the name pool, such as where the names in the name pool are ordered (e.g., by the creator of the name pool). As another example, the anonymous user may be assigned a name that comprises characteristics appropriate for the user, such as where the user has establish particular nuances and quirks relative to the shared online environment.

Figure 6:
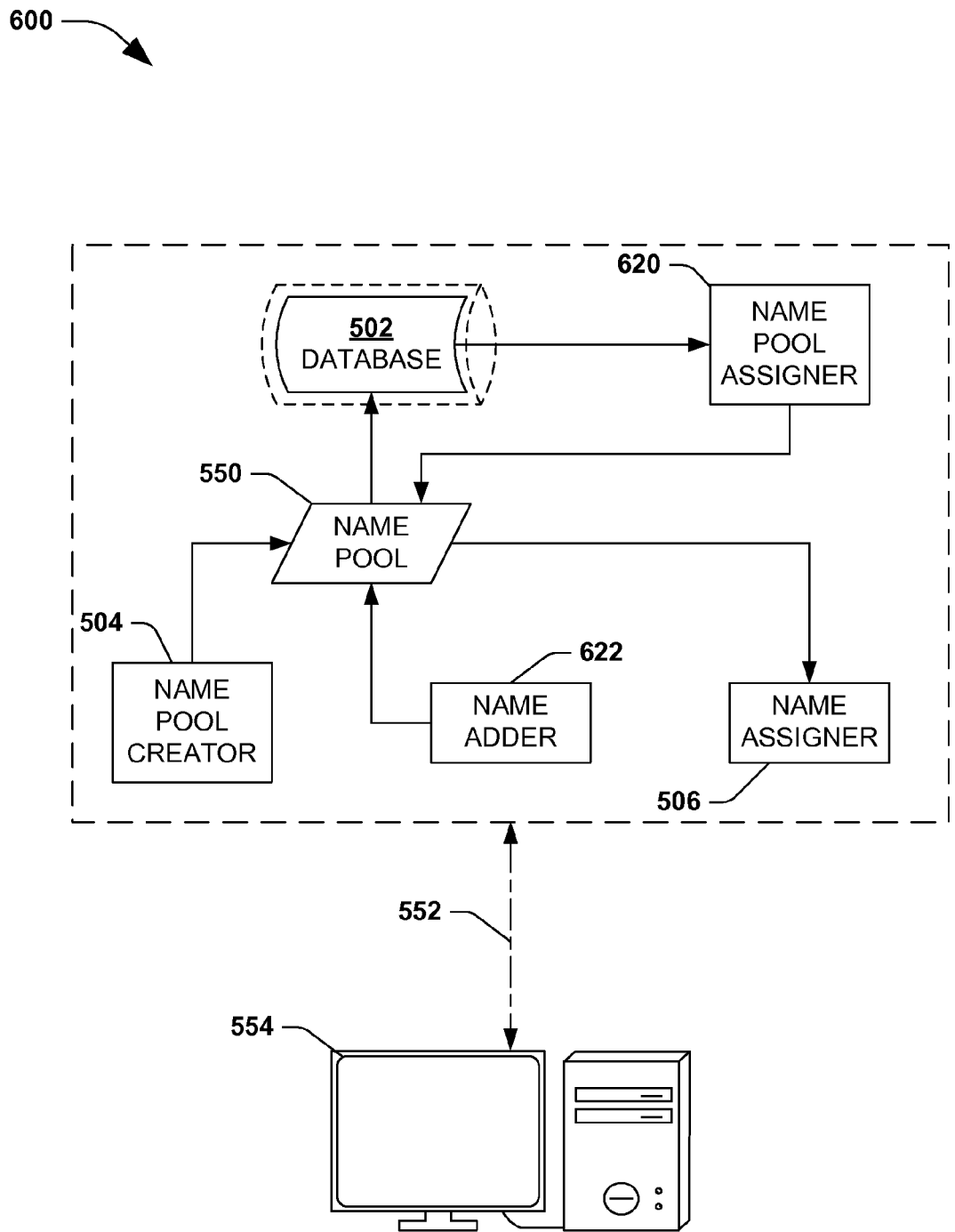
FIG. 6 is a component block diagram illustrating one embodiment of a system described herein.

FIG. 6 is a component block diagram illustrating an embodiment 600 of a system described herein. In this embodiment, the exemplary system 600 comprises a name pool assignment component 620 that can assign a name pool 550 to the shared online environment from the name pools stored in the database 502. Here, the assignment of the name pool can be, at least in part, based on characteristics of the name pool relative to the shared online environment. For example, where particular characteristics have been assigned to a name pool, as described above, the name pool can be selected for use in the shared online environment if the name pool characteristics appropriately match (e.g., as set by a desired matching threshold) the characteristics of the shared online environment.

Further, the exemplary system 600 comprises a name addition component 622 that can add an appropriate new name to the name pool if existing names in the name pool are fully assigned to existing user members in the shared online environment. For example, if the name pool 550 comprise ten pseudonames, and each of the ten pseudonames have been assigned to user members that have already anonymously connected to the shared online environment, the name addition component 622 can create a new name, so that when another user anonymously joins the shared environment a name will be available for assignment. In one embodiment the name addition component 622 may randomly create a tag, or may create a name that is relevant to the characteristics of the name pool.

Figure 7:
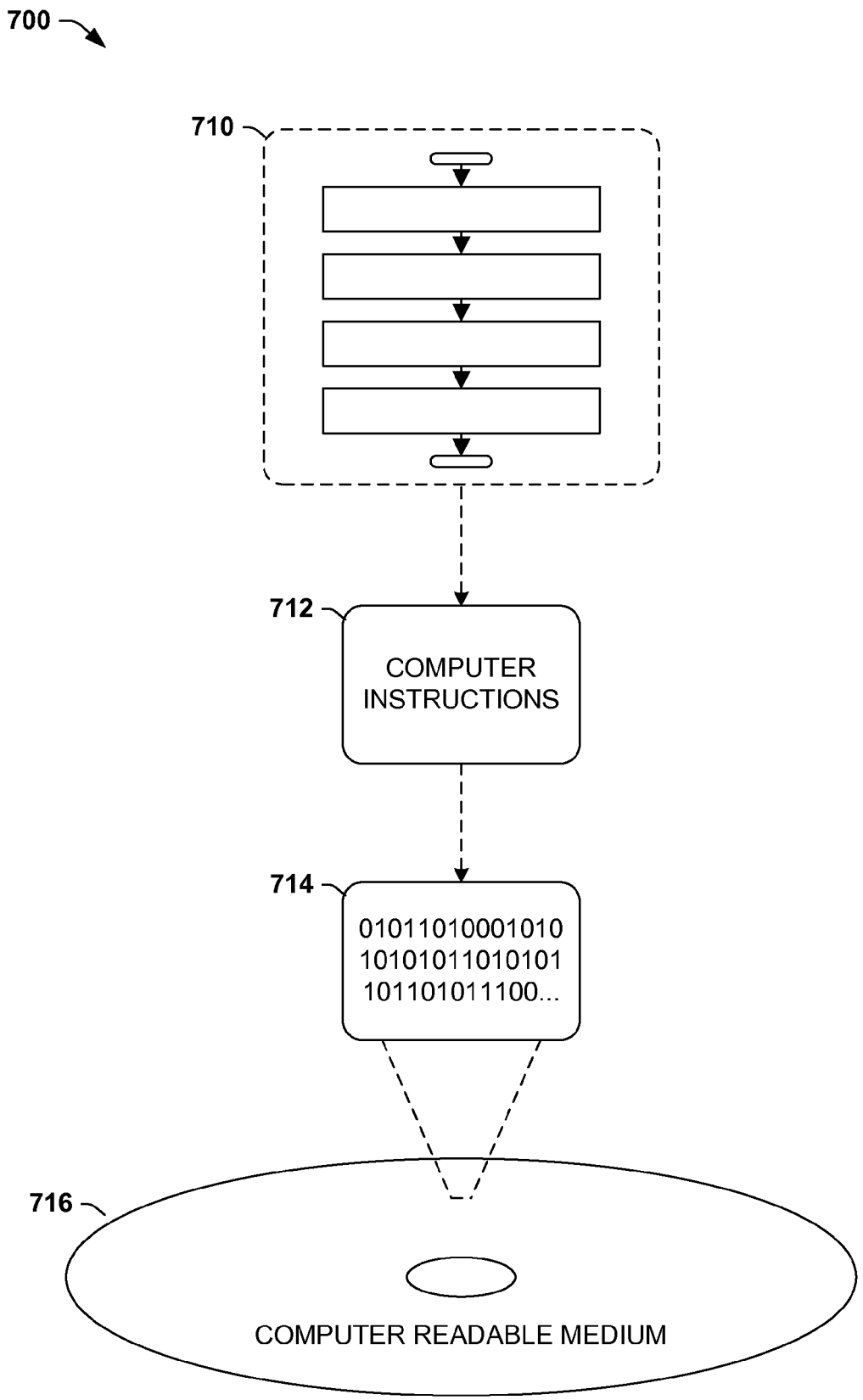
FIG. 7 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 708 (e.g., a CD-R, DVD-R, or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as the exemplary method 200 of FIG. 2, for example. In another such embodiment, the processor-executable instructions 704 may be configured to implement a system, such as the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
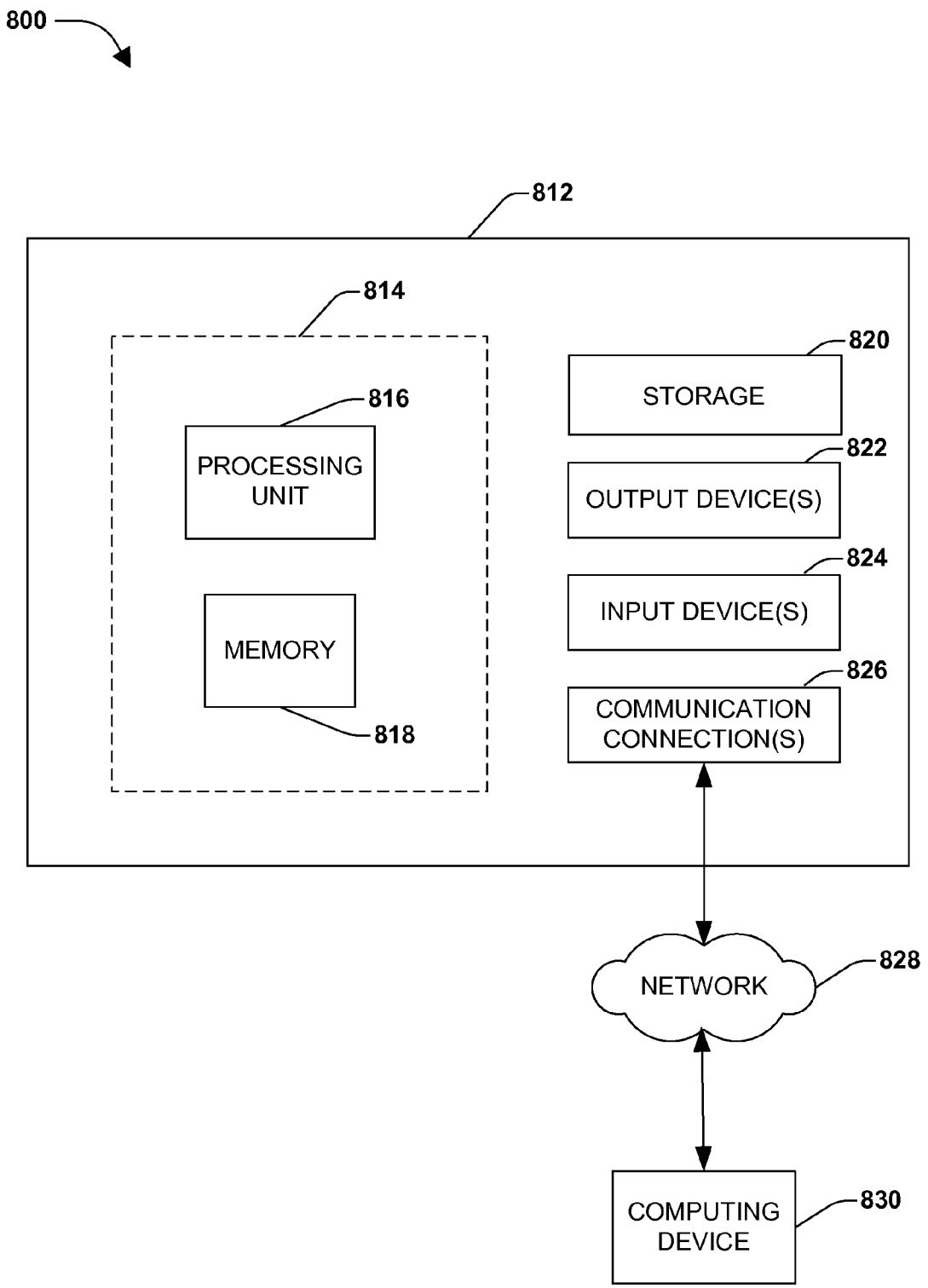
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, implemented at least in part via a processing unit, comprising:
    automatically selecting a contextually relevant name pool from a database comprising a plurality of name pools based upon a characteristic of an online environment;
    automatically assigning a contextually relevant name from the selected name pool to a member of the online environment based upon a developed characteristic of the member relative to the online environment, the developed characteristic of the member developed based upon a discussion associated with the member relative to the online environment; and
    automatically assigning a second contextually relevant name from the selected name pool to a second member of the online environment based upon a second developed characteristic of the second member relative to the online environment, the second developed characteristic of the second member developed based upon a second discussion associated with the second member relative to the online environment.

2. The method of claim 1, the automatically assigning a second contextually relevant name comprising assigning the second contextually relevant name based upon a third developed characteristic of the second member relative to the online environment.

3. The method of claim 2, the third developed characteristic of the second member developed based upon a third discussion associated with the second member.

4. The method of claim 1, the automatically assigning a contextually relevant name comprising assigning the contextually relevant name to the member when the member is anonymous in the online environment.

5. The method of claim 1, the selected name pool comprising a plurality of names.

6. The method of claim 1, the automatically assigning a second contextually relevant name comprising assigning the second contextually relevant name to the second member when the second member is anonymous in the online environment.

7. The method of claim 1, the automatically assigning a contextually relevant name comprising assigning the contextually relevant name to the member based upon a rank of the contextually relevant name and an order of an entrance of the member to the online environment.

8. The method of claim 1, the online environment comprising a shared online environment.

9. A system, implemented at least in part via a processing unit, comprising:
    a selection component configured to automatically select a contextually relevant name pool from a plurality of name pools based upon a characteristic of an online environment; and
    an assignment component configured to:
        automatically assign a contextually relevant name from the selected name pool to a member of the online environment based upon a developed characteristic of the member relative to the online environment, the developed characteristic of the member developed based upon a discussion associated with the member relative to the online environment; and
        automatically assign a second contextually relevant name from the selected name pool to a second member of the online environment based upon a second developed characteristic of the second member relative to the online environment, the second developed characteristic of the second member developed based upon a second discussion associated with the second member relative to the online environment.

10. The system of claim 9, the assignment component configured to automatically assign the second contextually relevant name from the selected name pool to the second member of the online environment based upon a third developed characteristic of the second member relative to the online environment.

11. The system of claim 10, the third developed characteristic of the second member developed based upon a third discussion associated with the second member.

12. The system of claim 9, the assignment component configured to automatically assign the contextually relevant name to the member when the member is anonymous in the online environment.

13. The system of claim 9, the selected name pool comprising a plurality of names.

14. The system of claim 9, the assignment component configured to automatically assign the contextually relevant name to the member based upon a rank of the contextually relevant name and an order of an entrance of the member to the online environment.

15. The system of claim 9, the online environment comprising a shared online environment.

16. The system of claim 9, the online environment comprising a shared online collaboration environment.

17. A method, implemented at least in part via a processing unit, comprising:
   selecting a contextually relevant name pool comprising a plurality of names from a plurality of name pools based upon a characteristic of an online environment;
   assigning a contextually relevant name from the selected name pool to a member of the online environment based upon a developed characteristic of the member relative to the online environment, the developed characteristic of the member developed based upon a discussion associated with the member relative to the online environment; and
   assigning a second contextually relevant name from the selected name pool to a second member of the online environment based upon a second developed characteristic of the second member relative to the online environment, the second developed characteristic of the second member developed based upon a second discussion associated with the second member relative to the online environment, the online environment comprising a shared online environment.

18. The method of claim 17, the assigning a second contextually relevant name comprising assigning the second contextually relevant name based upon a third developed characteristic of the second member relative to the online environment.

19. The method of claim 18, the third developed characteristic of the second member developed based upon a third discussion associated with the second member.

20. The method of claim 17, the assigning a contextually relevant name comprising assigning the contextually relevant name to the member automatically when the member is anonymous in the online environment.

* * * * *